United States Patent
Fleureau et al.

(10) Patent No.: US 10,885,658 B2
(45) Date of Patent: Jan. 5, 2021

(54) METHOD AND APPARATUS FOR ESTIMATING A POSE OF A RENDERING DEVICE

(71) Applicant: INTERDIGITAL CE PATENT HOLDINGS, Paris (FR)

(72) Inventors: Julien Fleureau, Rennes (FR); Franck Galpin, Thorigne-Fouillard (FR); Xavier Burgos, Barcelona (ES)

(73) Assignee: InterDigital CE Patent Holdings, SAS., Paris (FR)

( * ) Notice: Subject to any disclaimer, the term of this patent is extended or adjusted under 35 U.S.C. 154(b) by 94 days.

(21) Appl. No.: 16/094,863

(22) PCT Filed: Apr. 6, 2017

(86) PCT No.: PCT/EP2017/058223
§ 371 (c)(1),
(2) Date: Oct. 18, 2018

(87) PCT Pub. No.: WO2017/182284
PCT Pub. Date: Oct. 26, 2017

(65) Prior Publication Data
US 2019/0147612 A1  May 16, 2019

(30) Foreign Application Priority Data
Apr. 21, 2016  (EP) .................................... 16305461

(51) Int. Cl.
*G06T 7/20* (2017.01)
*G06T 7/73* (2017.01)
*G02B 27/01* (2006.01)
*G01C 21/16* (2006.01)
*G06F 3/0346* (2013.01)

(52) U.S. Cl.
CPC .............. *G06T 7/73* (2017.01); *G01C 21/165* (2013.01); *G02B 27/017* (2013.01); *G06F 3/0346* (2013.01); *G06T 7/20* (2013.01); *G02B 2027/014* (2013.01); *G02B 2027/0138* (2013.01); *G02B 2027/0187* (2013.01)

(58) Field of Classification Search
CPC .......... G06T 7/73; G06T 7/20; G02B 27/017; G02B 2027/0138; G02B 2027/014; G02B 2027/0187; G01C 21/165; G06F 3/0346
See application file for complete search history.

(56) References Cited

U.S. PATENT DOCUMENTS

| 7,206,016 B2 | 4/2007 | Gu | |
|---|---|---|---|
| 10,020,009 B1* | 7/2018 | Burke | ................... G06F 3/0346 |
| 2005/0183275 A1* | 8/2005 | Kwon | .................... G01C 17/30 33/361 |

(Continued)

*Primary Examiner* — Dominic E Rego
(74) *Attorney, Agent, or Firm* — Invention Mine LLC

(57) ABSTRACT

The present disclosure relates to methods, apparatus or systems for determining a final pose (21) of a rendering device. An initial pose is associated with the rendering device. A module (25) determines an intermediate pose (26) according to data from absolute pose sensors (23) and/or differential pose sensors (22). A module (27) determines the final pose (21) according to, first, a difference between the intermediate pose (26) and the initial pose information, second, the data from differential pose sensors (22), and third an evaluation of the visual perception of movements for current images (24) displayed on the rendering device.

13 Claims, 3 Drawing Sheets

(56) References Cited

U.S. PATENT DOCUMENTS

Figure 1:
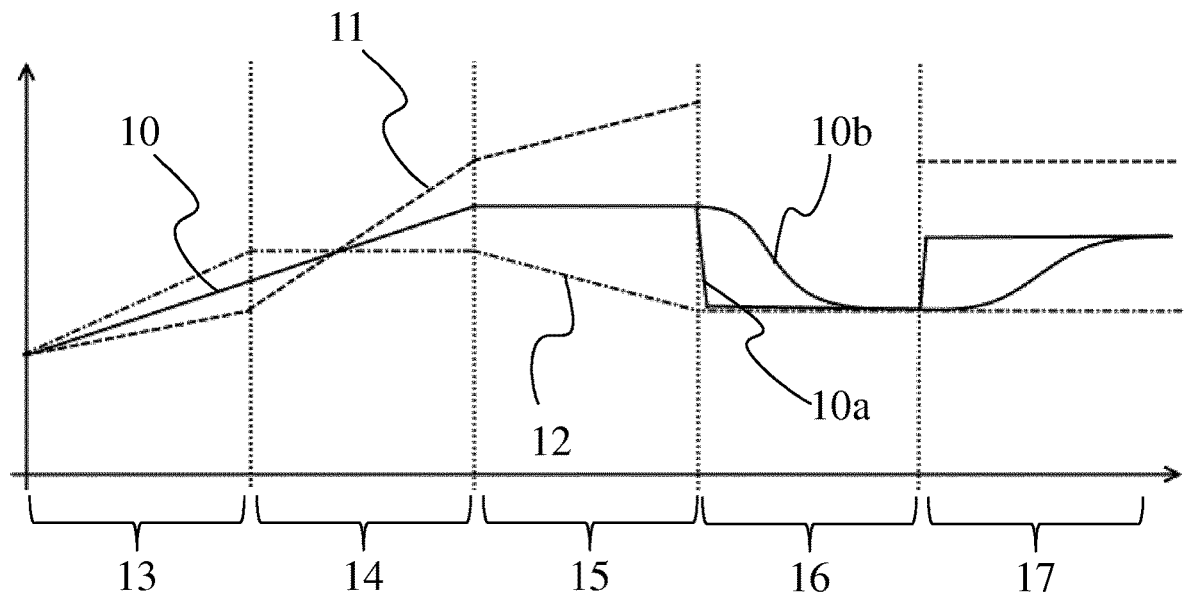

| | | | |
|---|---|---|---|
| 2005/0253849 A1* | 11/2005 | Reddy | G06T 13/20 |
| | | | 345/473 |
| 2009/0179900 A1* | 7/2009 | Petrovic | G06T 13/40 |
| | | | 345/473 |
| 2009/0295908 A1* | 12/2009 | Gharib | H04N 13/221 |
| | | | 348/46 |
| 2011/0125323 A1* | 5/2011 | Gutmann | G05D 1/0274 |
| | | | 700/258 |
| 2013/0218461 A1 | 8/2013 | Naimark | |
| 2014/0303643 A1* | 10/2014 | Ha | A61B 34/37 |
| | | | 606/130 |
| 2016/0055671 A1 | 2/2016 | Menozzi et al. | |
| 2016/0191903 A1* | 6/2016 | Zhang | H04N 13/261 |
| | | | 348/46 |
| 2017/0273665 A1* | 9/2017 | Kapoor | A61B 34/20 |

* cited by examiner

METHOD AND APPARATUS FOR ESTIMATING A POSE OF A RENDERING DEVICE

This application claims the benefit, under 35 U.S.C. § 365 of International Application PCT/EP2017/058223, filed Apr. 6, 2017, which was published in accordance with PCT Article 21(2) on Oct. 26, 2017, in English, and which claims the benefit of European Patent Application No. 16305461.2 filed Apr. 21, 2016.

TECHNICAL FIELD

The present disclosure relates to the domain of determining a pose of a rendering device by correlating data from absolute and differential pose sensors and the visual perception current images displayed on the rendering device. The rendering device is, for instance, a smartphone, a tablet or a Head Mounted Display (HMD).

BACKGROUND

Methods for estimating the pose of an object are numerous and various. Such methods aims at determining the location and the orientation of the object in a frame of reference as accurately as possible. The term "pose" gathers the measure of the location in the three-dimensional space (3 degrees of freedom) and the orientation of the object (3 degrees of freedom). So a pose is a six-dimension measure. Two kinds of sensors may be used for estimating the pose of an object: absolute pose sensors and differential pose sensors. A sensor contributes to determine at least one of the six dimensions of a pose.

Absolute pose sensors are sensors which are directly linked to the frame of reference in which the pose has to be estimated. For example, a magnetometer may be associated with the object. The North is linked to the frame of reference. When the object is rotating, the magnetometer measures the azimuth (only one dimension). A system of cameras may be installed in front or around the object in order to capture images of the object. The pose of the cameras in the frame of reference is accurately known. A processing of the captured images allows the estimation of the pose of the object in the frame of reference (from two to six dimensions according to the complexity of the system and of the image processing). The measurement error of absolute pose sensors is constant but relatively imprecise.

Differential pose sensors are sensors which are associated with the object itself and detect its movements. Gyroscopes and accelerometers are typically used in Inertial Measurement Units (IMU). These sensors do not directly measure the pose of the objects. Differential pose sensors measure a change in the pose, the new pose being determined by adding the detected change to the known pose. This kind of sensors works on a high frequency and are very precise. However their measurement error is cumulative over the time and is becoming significant after a while if not corrected.

To optimize the pose estimation and to correct the cumulative measurement error of the differential pose sensors, both types of sensors are combined. The pose is estimated by filtering every measures from every sensors. Several techniques are possible. For example, the pose may be an average of the information from the measures. The information issued from each type of sensors may be contradictory. The pose estimated by absolute pose sensors may vary while the pose estimated thanks to differential pose sensors is still. Movement model-based filters may introduce a damping phenomenon: the estimated pose keeps on progressing while sensors, in particular differential ones, perceive no movement. Some pose sensors may lose the signal or have a low frequency acquisition. This may lead to sudden jumps in the pose estimation or create a damping phenomenon.

An immersive content rendering device is a rendering device which display only a part of an image and allow the user to browse the image by moving the display itself to "look around" and discover the image around him. Smartphones, tablet or HMD are for example used to render immersive content such as immersive videos or virtual reality scenes (e.g. in a game). The pose estimation of such a rendering device has to be consistent with the real movement of the user. This is particularly true for HMD. Indeed the browsing is controlled by the pose estimating, so, the displayed image. If the pose estimation does not accurately match with the user's movement, what the user is seeing does not correspond to what his vestibular system indicates to his brain, at the risk of making him sick (simulator sickness). For such rendering devices, it is important to determine the pose by correlating the data from the set of pose sensors (absolute and differentials) and the visual perception of the current images displayed on the rendering device.

SUMMARY

The purpose of the present disclosure is to overcome the discrepancy between the determined pose of a rendering device and the visual perception of the current image. The present disclosure relates to a method of determining a final pose information of a rendering device, an initial pose information being associated with the rendering device, the method comprising:
- Determining an intermediate pose information according to data representative of an absolute pose information of the rendering device and/or a differential pose information of the rendering device;
- Determining the final pose information according to a difference between the intermediate pose information and the initial pose information, the data representative of a differential pose information and an information representative of a visual perception of the current image displayed on the rendering device.

According to a particular embodiment, the determining of the final pose information comprises:
- Determining a first coefficient representative of a perception of movement according to the difference between the intermediate pose information and the initial pose information and the data representative of the differential pose information,
- Determining a second coefficient representative of the visual perception of the current image displayed on said rendering device,
- Determining the final pose information between the initial pose and the intermediate pose information according to a combination of said first and second coefficient.

According to particular characteristics, the first coefficient is determined by applying the difference between the intermediate pose information and the initial pose information to a function centered on the differential pose information and with a standard deviation proportional to the differential pose information.

According to a specific characteristic, the second coefficient is determined according to features of the current displayed image, said features belonging to a set of features comprising measures of luminosity, blurriness, saturation, hue or saliency.

In a particular embodiment, the second coefficient is determined according to features of a sequence of at least two images comprising the current displayed image, said features belonging to a set of features comprising measures of energy, entropy or optical flow.

According to a specific characteristic, the second coefficient is determined according to a combination of features of the current displayed image and features of a sequence of at least two images comprising the current displayed image.

In a particular embodiment, the intermediate pose information is determined by a filtering method, said filtering method belonging to a set comprising Kalman filters or particle filters.

The present disclosure also relates to a device configured for determining a final pose information of a rendering device, an initial pose information being associated with the rendering device, the device comprising:

Means for determining an intermediate pose information according to data representative of an absolute pose information of the rendering device and/or a differential pose information of the rendering device;

Means for determining the final pose information according to a difference between the intermediate pose information and the initial pose information, the data representative of a differential pose information and an information representative of a visual perception of the current image displayed on said rendering device.

The present disclosure also relates to a device configured for determining a final pose information of a rendering device, an initial pose information being associated with the rendering device, the device comprising at least one processor configured to:

Determine an intermediate pose information according to data representative of an absolute pose information of the rendering device and/or a differential pose information of the rendering device;

Determine the final pose information according to a difference between the intermediate pose information and the initial pose information, the data representative of a differential pose information and an information representative of a visual perception of the current image displayed on said rendering device.

LIST OF FIGURES

Figure 2:
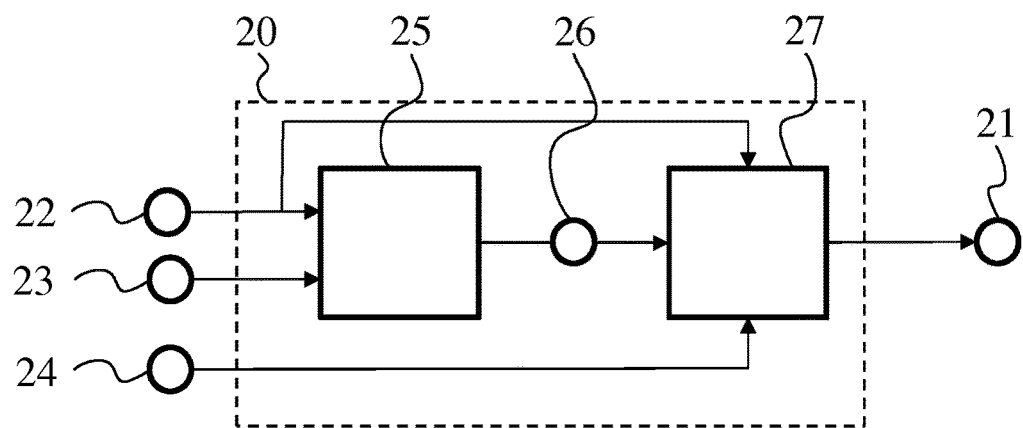
Figure 3:
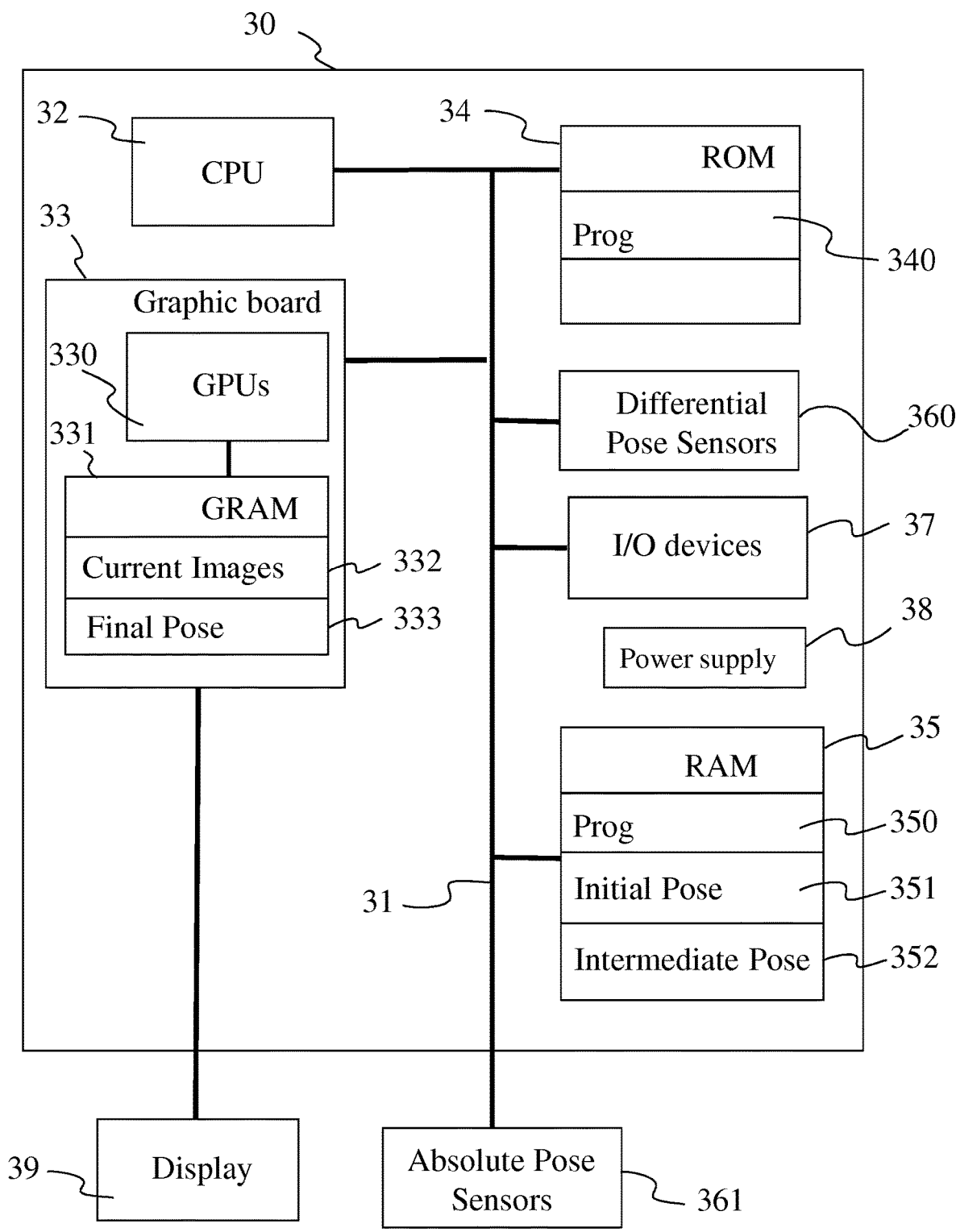
Figure 4:
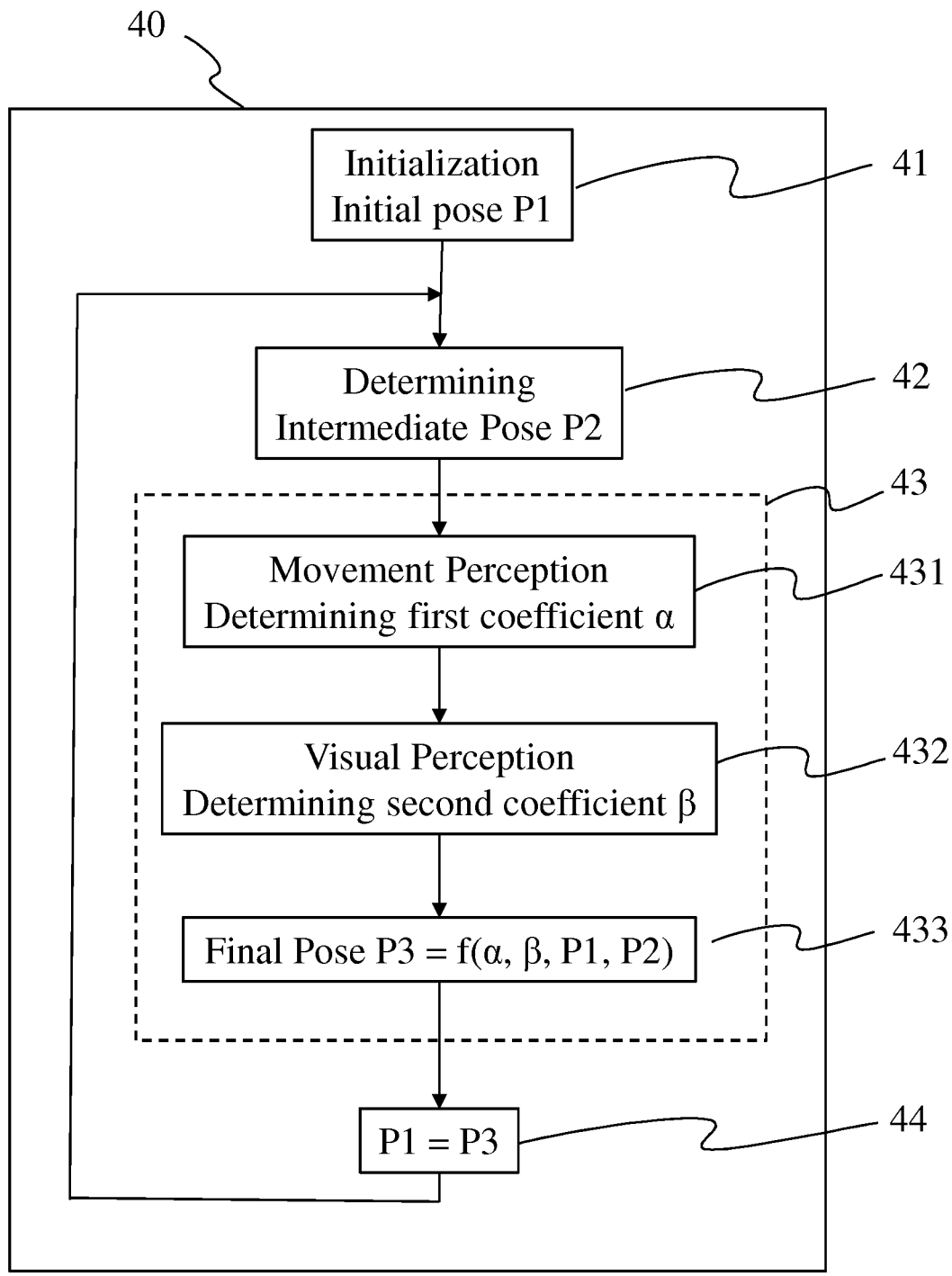

The present disclosure will be better understood, and other specific features and advantages will emerge upon reading the following description, the description making reference to the annexed drawings wherein:

FIG. 1 illustrates an example determining of an intermediate pose by filtering data from a set of at least one absolute pose sensor on one hand and a set of at least one differential sensor on the other hand, according to a specific embodiment of the present principles;

FIG. 2 diagrammatically shows a structure of a system configured to determine a final pose by using the intermediate pose information of FIG. 1 and data from absolute and differential pose sensors of FIG. 1 and according to the images currently displayed by the rendering device, according to a specific embodiment of the present principles;

FIG. 3 diagrammatically shows a hardware embodiment of the system of FIG. 2, according to a specific embodiment of the present principles;

FIG. 4 diagrammatically shows an embodiment of a method as implemented in the processing device of FIG. 3 according to a non-restrictive advantageous embodiment.

DETAILED DESCRIPTION OF EMBODIMENTS

The subject matter is now described with reference to the drawings, wherein like reference numerals are used to refer to like elements throughout. In the following description, for purposes of explanation, numerous specific details are set forth in order to provide a thorough understanding of the subject matter. It is understood that subject matter embodiments can be practiced without these specific details.

According to a non-limitative embodiment of the present disclosure, a method of determining a pose of an immersive content rendering device by correlating the perception of movement and the visual perception. Absolute and differential pose sensors are associated respectively with the frame of reference in which the pose is estimated and with the device. At the initialization phase an initial pose is determined according to absolute pose sensors. Data from at least absolute pose sensors and optionally data from differential pose sensors are filtered by a first module to determine an intermediate pose. A second module computes a first coefficient according to a model of the perception of movement and a second coefficient according to a model of visual perception of the image currently displayed by the rendering device. These coefficients are used to compute a final pose, from the initial pose and in the direction of intermediate pose in order that movement perception and visual perception correlate. To proceed to a new estimation, the value of the final pose is set to the initial pose and a new intermediate pose is determined.

The initial pose is a first pose information; the intermediate pose is a second pose information and the final pose is a third pose information.

FIG. 1 illustrates an example determining of an intermediate pose 10 by filtering data from a set of at least one absolute pose sensor on one hand and a set of at least one differential sensor on the other hand. For the sake of clarity, FIG. 1 illustrates an example of one dimension (of the six dimensions of a pose), for instance the azimuth. It is understood that the present principles are extendable to a six-dimension information. In FIG. 1, data from absolute pose sensors constitute a first pose estimation 11 which vary over the time and data from differential pose sensors are cumulated to constitute a second pose estimation 12 which vary over the time independently from the first pose 11. The filtering consists in averaging first and second pose to determine the intermediate pose 10. In a first period of time 13 first and second pose diverge. However both progress in the same direction. The filtering compensate this divergence and the intermediate pose 10 is progressing in the same direction than the second pose 12. During this period of time, in the example of a HMD, the user is rotating his head in a direction and perceive this movement. The browsing of the image, led by the pose estimation, rotates in the same direction, lightly slower. During a period like 13, the visual perception is consistent with the movement perception and the intermediate pose may be used directly as the final pose.

During periods 14 and 15, this consistency is broken. Indeed, the second pose, built according to the accumulation of data from the differential sensors, does no longer progress in the same direction than the intermediate pose. During period 14, differential sensors indicate that the user does not move. However, absolute sensors indicate that he rotates his head. The filtering module averages both values and determines that the user rotates his head. As differential sensors are more precise than absolute sensors, that means that the user is unmoving but the browsing keeps on rotating. During period 15, first and second pose are progressing in opposite directions. The filtering module determines that the device is standing still while the user is actually rotating his head. These situations have to be avoided as they are source of sickness by introducing an inconsistency between the motion perception and the visual perception (typically simulator sickness, seasickness, space sickness, transport sickness in general).

During period 16, the signal from the absolute sensors is lost. This might happen, for example if the absolute sensor is a camera filming the front side of a HMD. When the user is rotating more than a quarter turn or when he is moving out of the field of view of the camera, the signal is lost. The filtering module has only data from differential sensors to determine the intermediate pose. In a first variant, the intermediate pose jumps from an average value to the value of the second pose as illustrated by section 10$a$ of the curve 10. In a second variant, the filtering module progressively interpolates the intermediate pose with the second pose and damps the value up to the second pose value as illustrated by the section 10$b$ of the curve 10. During period 17, the signal from the absolute pose sensors is retrieved and the same phenomena of jumping or damping appear.

In variants, more sophisticated filtering methods, for instance model-based filtering, particle filtering or Kalman filtering, may be used. Inconsistency, damping and/or jumping phenomena appear under different conditions but exist though with such filtering modules.

FIG. 2 diagrammatically shows a structure of an apparatus 20 configured to determine a final pose 21 from data from absolute and differential pose sensors (resp. 22 and 23) and according to the images 24 currently displayed by the rendering device. The apparatus is composed of two modules 25 and 27. The modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the present principles are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components. A module comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

A first module 25 is determining an intermediate pose 26 by filtering data from pose sensors of both types. The module 25 may implement an averaging filtering or model-based filtering such as a Kalman Filter for example. In a variant, the first module 25 takes only absolute pose sensors data into account to determine the intermediate pose 26. A module 27 tests whether the intermediate pose is consistent with the data from the differential pose sensors. If values are consistent (i.e. they are progressing in the same direction) the intermediate pose is used as the final pose. If values are not consistent, the module 27 checks if the intermediate pose can be reached without disturbing the visual perception. The module 27 computes a coefficient β (also called second coefficient in the following) representative of the visual perception of the image currently displayed on the screen. For example, the module 27 may test the luminosity of the current image. If the luminosity is under a threshold (i.e. the image is globally dark), the final pose is close to the intermediate pose following the equation (1) with a coefficient β close to 1.0.

$$P_3 = P_1 + \beta \cdot (P_2 - P_1) \quad \text{[eq. (1)]}$$

In equation (1) $P_3$ is the final pose, $P_1$ the initial pose and $P_2$ the intermediate pose. If the luminosity is high (i.e. details of the image are clearly visible), the module 27 attributes a low value (i.e. close to 0.0) to the coefficient β. The module 27 may be declined in various embodiments. For instance, the final pose may be determined according to equation (2), where δ is the movement detected by the differential pose sensors.

$$P_3 = (P_1 + \delta) + \beta \cdot (P_1 + \delta)) \quad \text{[eq. (2)]}$$

In a variant, the coefficient β is determined according to the measurement of a feature of the current image, the feature belonging, for example, to the following set of image features: luminosity, blurriness, saturation, hue or saliency; or to a combination of at least two of these features. In a variant, the coefficient β is determined according to the measurement of a feature of a sequence of image, the sequence including the current image and the feature belonging to a set of features for example comprising the following ones: the energy, the entropy, or the optical flow of the sequence.

In a set of variants, the module 27 does not test the consistency of the intermediate pose according to the movement δ perceived by the differential pose sensors. Instead, the module 27 computes a coefficient α (also called first coefficient) according to the movement δ perceived by the differential pose sensors and the difference between the intermediate pose and the initial pose, for example with equation (3) (i.e. normal distribution) or equation (4) (piecewise distribution).

$$\alpha = e^{\left(\frac{-P_2 + P_1 + \delta}{2k\delta}\right)} \quad \text{[eq. (3)]}$$

$$\text{if } (|\delta - (P_2 - P_1)| > k) \text{ then } \alpha = 1 \text{ else } \alpha = 0 \quad \text{[eq. (4)]}$$

Where k is a given standard deviation value. The coefficient α may be used alone by replacing the coefficient β in equations (1) or (2). In another embodiment, coefficients α and β are combined to be used as the coefficient of equations (1) or (2), for instance by multiplying them or averaging them.

In equations (3) and (4), the more there is a difference between the intermediate pose $P_2$ (the curve 10 of FIG. 1) and the pose as perceived by the differential sensors (the curve 12 of FIG. 1), the smaller the first coefficient α is. Used in equations (1) or (2) according to the various embodiments described here, the first coefficient α prevent the final pose to get too away from the pose as perceived by the differential sensors. As differential sensors are very precise, the final pose, and so the displayed images, corresponds to the movement of the user. However, as differential sensors have a cumulative measurement error, the intermediate pose is viewed as the pose to be reached because the intermediate pose is determined to be optimal according to both absolute and differential pose sensors. The role of the second coefficient β, as determined in the present disclosure, consists in getting the final pose closer to the intermediate pose when the visual perception of this correction is weak enough. This has the advantage to keep the final pose as optimal as possible without making the user sick.

Poses $P_1$, $P_2$ and $P_3$ in equations (1), (2), (3) and (4) are up to six-dimension variables. When the final pose $P_3$ is determined, the value of the initial pose $P_1$ is set to the value of the final pose $P_3$ and new poses are determined.

FIG. 3 diagrammatically shows a hardware embodiment of a device 30 configured to determine a final pose from data from absolute and differential pose sensors and according to the image currently displayed by the rendering device. In this example, the device 30 comprises the following elements, connected to each other by a bus 31 of addresses and data that also transports a clock signal:
- a microprocessor 32 (or CPU),
- a graphics card 33 comprising:
  - at least one Graphical Processor Units (or GPUs) 330,
  - a Graphical Random Access Memory (GRAM) 331,
- a non-volatile memory of ROM (Read Only Memory) type 34,
- a Random Access Memory or RAM 35,
- at least one differential sensor 36 (e.g. gyroscopes, accelerometers),
- I/O (Input/Output) devices 37 such as for example a tactile interface, a mouse, a webcam, etc. and
- a power source 38.

Advantageously, the device 30 is connected to one or more display devices 39 of display screen type directly to the graphics card 33 to display current images 332 calculated in the graphics card according to the final pose 333. According to a particular embodiment, display devices 39 are integrated in the device 30 (e.g. HMD, smartphones, or tablets).

It is noted that the word "register" used in the description of memories 331, 34 and 35 designates in each of the memories mentioned, both a memory zone of low capacity (some binary data) as well as a memory zone of large capacity (enabling a whole program to be stored or all or part of the data representative of data calculated or to be displayed).

When switched-on, the microprocessor 32 loads and executes the instructions of the program contained in a register 340 the RAM 34.

The random access memory 35 notably comprises:
- in a register 330, the operating program of the microprocessor 32 responsible for switching on the device 30,
- data 351 representative of the initial pose of the rendering device,
- data 352 representative of the intermediate pose.

According to one particular embodiment, the algorithms implementing the steps of the method specific to the present disclosure and described hereafter are advantageously stored in the memory GRAM 331 of the graphics card 33 associated with the device 30 implementing these steps. When switched the graphic processors 330 of the graphics card 33 load the program 350 into the GRAM 331 and execute the instructions of these algorithms in the form of microprograms of "shader" type using HLSL (High Level Shader Language) language or GLSL (OpenGL Shading Language) for example. The graphics card 33 render the video content according to the determined final pose that is stored in a register 333 of the GRAM 331. The random access memory GRAM 331 notably comprises data representative of the current images of the video content in a register 332.

According to another variant, a part of the RAM 35 is assigned by the CPU 32 for storage of the rendering of the video content. This variant however causes greater latency time in the composition of an image as the data must be transmitted from the random access memory 35 to the graphics card 33 passing by the bus 31 for which the transmission capacities are generally inferior to those available in the graphics card for transmission of data from the GPUs to the GRAM and vice-versa.

According to another variant, the power supply 38 is external to the device 30. In one particular embodiment, one or several differential pose sensors 360 are external to the device 30. In another embodiment, one or several absolute pose sensors are integrated in the device 30 (e.g. magnetometers).

FIG. 4 diagrammatically shows an embodiment of a method 40 as implemented in a processing device such as the device 30 according to a non-restrictive advantageous embodiment.

In an initialization step 41, an initial pose is determined for the rendering device according to data from the absolute pose sensors only. Indeed, at this step, differential pose sensors do not yet send any data. This first initial pose is stored in a register 351 of the RAM 35 of the device 30. In a variant, the initial pose, also called $P_1$, is stored in a register of the GRAM 331.

A step 42 is executed when new data from absolute and/or differential pose sensors are obtained. The step 42 is executed by the module 25 of FIG. 2. At this step an intermediate pose 26, also called $P_2$, is determined by filtering data from pose sensors of both types. The module 25 may implement an averaging filtering or model-based filtering such as a Kalman Filter for example. In a variant, the intermediate pose is the pose determined by absolute pose sensors' data only. The intermediate pose is seen as an optimal pose estimation.

At a step 43, the final pose, also called $P_3$, is determined according to initial pose $P_1$, the intermediate pose $P_2$, data from differential pose sensors and current images displayed by the rendering device 30. The step 43 is composed of three sub-steps which may be implemented according to various embodiments.

At a step 431, an evaluation of the consistency of the intermediate pose $P_2$ regarding data provided by differential pose sensors is performed. If the intermediate is progressing (regarding to the initial pose $P_1$) in the same direction than the movement perceived by the differential pose sensors (i.e. if the intermediate pose is consistent with the movement of the user at this moment), the intermediate pose is used as final pose. In this case, the step 44 is directly executed. Otherwise, a default value (e.g. 0.0 or 0.1) is attributed to a first coefficient α and the step 432 is executed. In a variant of the step 431, a coefficient α, also called first coefficient, is computed according to the initial and the intermediate pose values and data from the differential pose sensors. Equations (3) or (4), for example, may be used to compute the first coefficient. This coefficient α represents a force to keep the final pose consistent with the perceived movement. In this embodiment, step 432 is executed.

The step 432 consists in computing a second coefficient β which represents the level of visual perception of movements. For instance, if the currently displayed sequence of images is dark or fuzzy, for example, the visual perception of movements is considered as low. Similarly, if the currently displayed sequence of images correspond to a rapid dollying in (or out), travelling or panning or tilting or zooming (in or out), the visual perception of movements is also considered low as the user is not able to precisely view the details of the image. If the level of visual perception of movements is low, the second coefficient β is high (for example close to 1.0, for instance 0.95).

Step 433 uses the information calculated in previous steps to determine the final pose. As the intermediate pose is considered as optimal, the final pose has to be as close as possible to the intermediate pose as long as the intermediate pose is consistent with the movement δ perceived by the differential pose sensors. Various embodiments may obey this principles as, for instance, the equation (5).

$$P_3 = P_1 + \frac{\alpha + \beta}{2} \cdot (P_2 - P_1) \qquad \text{[eq. (5)]}$$

Once a final pose is determined, the value of $P_3$ is used by the graphics board 33 to render next current images. A step 44 consists in attributing the value of $P_3$ to $P_1$. The step 42 is executed again when new data are received from absolute and/or differential pose sensors.

Naturally, the present disclosure is not limited to the embodiments previously described.

In particular, the present disclosure is not limited to a method of determining a final pose information of a rendering device but also extends to any method of transmitting this final pose information to the rendering device and/or to any method of rendering an image according to the final pose information. The implementation of calculations necessary to generate the initial, intermediate and final pose information and the first and second coefficients is not limited either to an implementation in shader type microprograms but also extends to an implementation in any program type, for example programs that can be executed by a CPU type microprocessor. The use of the methods of the present disclosure is not limited to a live utilisation but also extends to any other utilisation, for example for processing known as postproduction processing in a recording studio.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of determining a third pose of a rendering device, the method comprising:
   determining a second pose of the rendering device according to first data provided, at a given time, by sensors detecting an absolute pose of the rendering device in a frame of reference and differential data provided, at the given time, by inertial measurement sensors;
   determining the third pose according to a difference between the second pose and a first pose associated with the rendering device, the differential data and parameters of a current image displayed on the rendering device, wherein the second pose is subsequent to the first pose;

wherein determining the third pose comprises:
   determining a first coefficient representative of a perception of movement according to the differential data and according to the difference between the second pose and the first pose;
   determining a second coefficient representative of the visual perception of the current image displayed on the rendering device;
   determining the third pose between the first pose and the second pose according to a combination of the first coefficient and the second coefficient.

2. The method of claim 1, wherein the first coefficient is determined by applying the difference between the second pose and the first pose to a function centered on the differential pose.

3. The method of claim 1, wherein the second coefficient is determined according to features of the current displayed image, the features belonging to a set of features comprising measures of luminosity, blurriness, saturation, hue and saliency.

4. The method of claim 1, wherein the second coefficient is determined according to features of a sequence of at least two images comprising the current displayed image, the features belonging to a set of features comprising measures of energy, entropy and optical flow.

5. The method of claim 1, wherein the second coefficient is determined according to a combination of features of the current displayed image and features of a sequence of at least two images comprising the current displayed image.

6. The method of claim 1, wherein the second pose is determined by a filtering method, the filtering method belonging to a set comprising Kalman filters and particle filters.

7. A device configured to determine a third pose of a rendering device, the device comprising a memory associated with at least one processor configured to:
   determine a second pose of the rendering device according to absolute first data provided, at a given time, by sensors detecting an absolute pose of the rendering device in a frame of reference and to differential data provided, at the given time, by inertial measurement sensors;
   determine the third pose according to a difference between the second pose and a first pose associated with the rendering device, the differential data parameters of a current image displayed on the rendering device, wherein the second pose is subsequent to the first pose;

wherein to determine the third pose comprises:
   determining a first coefficient representative of a perception of movement according to the differential data and according to the difference between the second pose and the first pose;
   determining a second coefficient representative of the visual perception of the current image displayed on the rendering device;
   determining the third pose between the first pose and the second pose according to a combination of the first coefficient and the second coefficient.

8. The device of claim 7, wherein the first coefficient is determined by applying the result of a difference between the second pose and the first pose to a function centered on the differential pose.

9. The device of claim 7, wherein the second coefficient is determined according to features of the current displayed image, the features belonging to a set of features comprising measures of luminosity, blurriness, saturation, hue and saliency.

10. The device of claim 7, wherein the second coefficient is determined according to features of a sequence of at least two images comprising the current displayed image, the features belonging to a set of features comprising measures of energy, entropy and optical flow.

11. The device of claim 7, wherein the second coefficient is determined according to a combination of features of the current displayed image and features of a sequence of at least two images comprising the current displayed image.

12. The device of claim 7, wherein the second pose is determined by a filtering method, the filtering method belonging to a set comprising Kalman filters and particle filters.

13. The device of claim 7, further comprising a transmitter configured to transmit the third pose to the rendering device.

* * * * *